| United States Patent [19] | [11] | 4,445,939 |
|---|---|---|
| Hodson | [45] | May 1, 1984 |

[54] STRIPPING AND CONDITIONING SOLUTIONS FOR TREATING COATED SUBSTRATES AND METHOD FOR THEIR USE

[76] Inventor: James V. Hodson, 1650 E. 500 South, Fruit Heights, Utah 84037

[21] Appl. No.: 409,544

[22] Filed: Aug. 19, 1982

[51] Int. Cl.$^3$ .............................................. C23G 5/02
[52] U.S. Cl. ........................................ 134/2; 134/38; 252/171
[58] Field of Search ................. 134/38, 2; 252/165, 252/171, DIG. 8

[56] References Cited

U.S. PATENT DOCUMENTS

| 3,574,123 | 4/1971 | Laugle | 252/165 |
|---|---|---|---|
| 3,988,256 | 11/1976 | Vandermey et al. | 252/171 |
| 4,097,395 | 6/1978 | Posey et al. | 134/2 |
| 4,269,724 | 5/1981 | Hodson | 134/38 |

FOREIGN PATENT DOCUMENTS 749898  6/1956  United Kingdom ............... 252/171

*Primary Examiner*—S. Leon Bashore, Jr.
*Assistant Examiner*—Michael K. Boyer
*Attorney, Agent, or Firm*—Thorpe, North & Western

[57] ABSTRACT

Solutions useful for stripping coatings from coated substrates and conditioning the substrate for subsequent coating treatment are obtained by mixing in special proportions (1) a solvent composition comprising a chlorinated solvent and a liquid alcohol containing at least three carbon atoms, (2) a wetting composition comprising basic metal ammonium salt of an aromatic sulfonic acid, and a non-ionic surface active material, and (3) a vapor suppressant and said mixture preferably containing a small amount of water. A method for using these solutions for stripping and conditioning coated substrates, and particularly metal substrates, is also disclosed.

20 Claims, No Drawings

STRIPPING AND CONDITIONING SOLUTIONS FOR TREATING COATED SUBSTRATES AND METHOD FOR THEIR USE

BACKGROUND OF THE INVENTION

1. Field of the Invention

This invention relates to a new and improved stripping solution. More particularly, the invention relates to a new type of stripping solution which not only rapidly removes coatings from coated substrates but also conditions the substrate for subsequent coating treatments.

Specifically, the invention provides a new and improved stripping solution which is effective in removing all types of coatings from coated substrates and conditioning the resulting substrate for immediate coating with other materials, which new stripping solutions are obtained by mixing in special proportions (1) a solvent composition comprising a chlorinated solvent and a liquid alcohol containing at least three carbon atoms, (2) a wetting composition comprising basic metal ammonium salt of an aromatic sulfonic acid, and a non-ionic surface active material, and (3) a vapor suppressant, and said mixture preferably containing a small amount of water. A method for using these solutions for stripping and conditioning coated substrates, and particularly metal substrates, is also disclosed.

2. Prior Art

There is a need in industry for compositions which can be used to strip coatings from substrate, such as metal and wood. This is particularly needed for the treatment of automobiles, buses, trucks, trains, boats, etc. which often require recoating because of extensive use.

The development of a satisfactory stripping solution is particularly difficult because of the great variety of coatings and substrates now in use in industry. The automotive industry uses a wide variety of coating systems, including electro-deposition primers (anodic-acrylic/cathodic epoxy), epoxy ester primers, acrylic lacquers, urethane and thermosetting acrylic enamel topcoats. Each of the major suppliers of original finishes have proprietary systems which can vary in composition and cross-linking density. Such coatings may be baked or air-dried.

The refinish market servicing the automotive, truck and aircraft industry also adds another myriad of systems including polyurethane and acrylic-urethanes. The substrate can vary from plastic (polyester, polyurethane, ABS) to metal (e.g. magnesium, aluminum, galvanized metal, cold rolled steel, etc.). The metal surfaces may be treated with phosphate to prevent rusting or chromated to passivate zinc or aluminum oxides.

One solution to the problem in the past has been to use sand blasting in removing the great variety of coatings. This has not been satisfactory, however, because of the dusty conditions involved, time consumed and the removal or damage of the surface of the substrate.

Attempts have been made to solve the problem by developing chemical solutions which could be used to strip the coatings from the substrate. The ideal stripping solution would be one that would be universally effective in removing all types of coatings and primer systems, would effect the stripping in a short period, and would require only one application of the solution. In addition, the stripping solution should leave the substrate, after final washing and rinsing, in such condition that it could be immediately recoated without additional treatment, such as phosphatizing or anodizing the said substrate. Finally, the ideal stripping solution would be one that is non-toxic or corrosive and could be easily disposed of after use.

The attempts to prepare such an ideal stripping solution have not been too successful in the past. Some of the stripping solutions developed have been effective against some types of coatings but ineffective against others. Some are effective only after numerous applications or after long periods of exposure to the stripping solutions.

A further defect of known stripping solutions, and one that is particularly important from a practical standpoint is that they all leave the stripped substrate in such condition that considerable treatment is required because it can be recoated. The prior known stripper compositions are acidic or basic activators and act by means of blistering, dissolving and otherwise removing the coatings. None of these known compositions act both as a stripper and a metal conditioner for subsequent coating treatment. A composition which would effect both a stripping and conditioning action would be a significant contribution to the art.

In addition, the prior known stripping compositions have been limited as they have had obnoxious odors and contain phenolics or acids and are hard to handle because of skin irritation. Others have not been biodegradable and disposition has been a problem.

Patents which disclose stripping compositions which have many of the above-noted defects include:
U.S. Pat. Nos. 2,443,173, 2,969,328, 3,650,969, 4,285,827, 3,106,929, 3,957,530, 3,979,219, 3,983,047, 3,988,256, 4,296,724.

It is an object of the invention, therefore, to provide a new and improved stripping solution. It is a further object to provide a new solution which acts both to remove the coating as well as condition the stripped substrate for subsequent coating treatment. It is a further object to provide a stripping and conditioning solution which is effective against all known coatings and primer compositions. It is a further object to provide a stripping and conditioning solution which is effective in a very short period of time even at normal temperatures and is effective even with one application of the solution. It is a further object to provide a stripping and conditioning solution which is non-corrosive and non-toxic and biodegradable. It is a further object to provide a stripping and conditioning solution which is economical to prepare and easily utilized. These and other objects of the invention will be apparent from the following detailed description thereof.

SUMMARY OF THE INVENTION

It has now been discovered that these and other objects can be accomplished by the new stripping and conditioning solutions of the present invention which are prepared by mixing in special proportions (1) a solvent composition comprising a chlorinated solvent and a liquid alcohol containing at least three carbon atoms, (2) a wetting composition comprising basic metal ammonium salt of an aromatic sulfonic acid, and a non-ionic surface active material, and (3) a vapor suppressant, and said mixture preferably containing a small amount of water. When used according to the process of the present invention these new stripping solutions demonstrate many new and highly desirable properties.

The new solutions are preferably utilized by spraying, dipping or brushing the coated substrate with the said solutions to a layer preferably from 30 mil to 50 mil thick, and then after a short period of time rinsing the treated substrate with water so as to remove the stripping solution and the coating itself.

When thus applied, it was surprising to find that the new stripping solutions were effective in removing 100 percent of all coating systems, including both the top coating and the primer coating. Further such action was obtained with just one application of the solution and after only a matter of minutes. While some of the prior known stripping solutions are effective against some types of coatings, none have been universally effective against all known types of coatings as in the present case. In addition, some of the prior known solutions have been effective only after several applications, while in the present case the solutions are effective after only the first application. Furthermore, many of the prior known solutions are effective after many hours of soaking while with the present solution, the stripping is accomplished after only a few minutes of treatment.

It has also been unexpectedly found that the use of the new stripping solutions of the present invention leaves the stripped substrate in such condition that it can be immediately treated with a surface coating composition to form a new coating. This was quite surprising in view of the fact that with other stripping solutions it was necessary to effect considerable treatment of the substrate as by, for example, phosphatizing or anodizing of the surface before a new coating could be applied. In the present case, even though the coating is applied immediately after stripping it is a very strong and adhesive coating having properties similar to those applied after extensive treatment of the substrate.

It has also been found that by the use of the new stripping solutions to surfaces, such as metal, a very thin film resides on the stripped substrate and imparts surprising resistance to rusting and oxidation. In the past when one has applied the known stripping solutions to metal substrate the surface has shown the appearance of rust within a few hours of the treatment. The new stripping solutions of the present invention, on the other hand, impart a passive metal surface to rusting and oxidation for a period of days even when exposed to outdoor conditions, rain, snow, etc. Those which have been retained inside without any special atmospheric control have remained free of rusting and oxidation for many months.

The above-noted bi-functional nature of the new stripping and conditioning solutions, i.e., providing for the removal of the coating as well as the conditioning of the substrate for subsequent treatment is indeed a new and important discovery and a valuable contribution to the art.

Further advantage is also found in the fact that the new solutions of the present invention are bio-degradable, water-soluble to the extent of at least 80 percent, non-caustic, non-flammable, non-corrosive and non-explosive. Such solutions are thus suitable for use by individual consumers as well as for industrial use.

DETAILED DESCRIPTION OF THE INVENTION

The new stripping and condition solutions of the present invention comprise a mixture in special proportions of (1) a solvent composition comprising a chlorinated solvent and a liquid alcohol containing at least three carbon atoms, (2) a wetting composition comprising basic metal ammonium salt of an aromatic sulfonic acid, and a non-ionic surface active material, and (3) a vapor suppressant, said mixture preferably containing a small amount of water. In order to present the inventive concept of the present invention in greatest possible detail, the following supplementary disclosure is submitted.

Solvent Composition

The solvent composition used in the present invention is made up of two components, i.e., the chlorinated solvent and the liquid alcohol containing at least three carbon atoms.

Any suitable chlorinated solvent can be used in the new stripping and conditioning solutions of the present invention. Examples of such solvents include the aliphatic and cycloaliphatic solvents, such as propylene dichloride, trichloroethane, dichloromethane (methylene chloride), dischlorocyclohexane, and trichlorobutane, and the aromatic chlorinated solvents, such as chlorobenzene, chlorotoluene and their di- and trichloro homologs. Particularly superior results are obtained with methylene chloride and that is the preferred chlorinated solvent to be used in the new stripping solutions.

The amount of the chlorinated solvent to be used in the new solutions may vary over a wide range depending upon the type of solvent selected and the coating to be treated. In general, the amount of the chlorinated solvent will vary from about 50 percent to 70 percent by weight of the stripping solution. Preferred amounts vary from about 62 percent to about 65 percent by weight.

The alcohol component of the solvent system may be any liquid alcohol containing at least three carbon atoms. The alcohol may be any monohydric or polyhydric alcohol and may be aliphatic, cycloaliphatic, aromatic or heterocyclic, such as, for example, dimethylcarbinol, tertiary butanol, isobutanol, cyclohexanol, benzyl alcohol, and the like, and mixtures thereof. Dimethylcarbinol is the preferred solvent to be used because of the superior results obtained therewith.

The amount of the alcohol to be used in the solution may vary. In general, the amount of the alcohol will vary from about 6 percent to 26 percent, and more preferably from about 11 percent to 20 percent. Particularly superior results are obtained when the amount of alcohol is about 16 percent by weight of the solution.

The role of the alcohol in the solvent system is not completely understood, but it is believed to act as a coupling material for the wetting agents involved in the new solutions. The unique phase separation of the solvent and the other ingredients give rise to a synergistic action that allows for the permeation of activators and solvents to phase at the interface of the metal substrate and allow for the removal of cathodic primer systems that cannot be removed when other types of alcohols are utilized. For example, the use of lower alcohols, such as methanol, act to inhibit the phase separation of activator and solvent at the interface, thus giving rise to a very poor removal of the cathodic primer system.

Wetting Agent Composition

The wetting agent composition used in the present invention is made up of two components, i.e., basic metal ammonium salt of an aromatic sulfonic acid, and a non-ionic surface active material.

The metal ammonium salt of an aromatic sulfonic acid is a new type of wetting agent that, in combination with the other component, gives surprisingly improved results. The aromatic sulfonic acid may be any aromatic nucleus having one or more sulfonic acid groups attached thereto. The acids may be polynuclear and polybasic but are preferably mononuclear and monobasic. Examples of such acids include, among others, benzene sulfonic acid, toluene sulfonic acid, xylene sulfonic acid, ethylbenzene sulfonic acid, cumene sulfonic acid, naphthalene sulfonic acid, styrene sulfonic acid, biphenyl sulfonic acid, anthracene sulfonic acid and the like, and mixtures thereof. Particularly preferred aromatic sulfonic acids are the benzene sulfonic acids.

The metals used in making the metal ammonium salts of the above-noted sulfonic acids include the alkali metals and some heavy metals, such as, for example, sodium, potassium, lithium, calcium, magnesium, aluminum, and the like. The preferred salts to be employed include the alkali metal salts such as the lithium, sodium, potassium and cesium, and the alkaline earth metals, such as magnesium, calcium, strontium and barium. Sodium salts are particularly preferred.

Examples of the metal ammonium aromatic sulfonates to be used as wetting agent components include, among others, sodium ammonium benzene sulfonate, potassium ammonium benzene sulfonate, sodium ammonium ethylbenzene sulfonate, calcium ammonium benzene sulfonate, lithium ammonium naphthalene sulfonate, sodium ammonium benzene sulfonate, sodium ammonium styrene sulfonate, potassium ammonium xylene sulfonate, a sodium ammonium biphenyl sulfonate.

The above-noted basic metal ammonium aromatic sulfonates are preferably prepared by reacting the desired aromatic sulfonic acid with the desired metal hydroxide in amounts preferably between 0.5 to 0.8 equivalent amounts and then to add an excess of ammonium hydroxide, preferably between 1 to 6 equivalents of the ammonium hydroxide. When employing the alkali metal hydroxides, one preferably prepares the sulfonates by adding the hydroxide to the sulfonic acid to obtain a pH ranging from about 4 to 5 and then adding the ammonium hydroxide to obtain a pH ranging from about 9 to 10.

Preparation of the sodium ammonium benzene sulfonate used in Example I is illustrated below:

100 ML of benzene sulfonic acid was added to a reaction vessel. Solid sodium hydroxide was added to bring the pH of the mixture to approximately 4 (approximately 0.8 equivalents) ammonium hydroxide (28 Baume) is then added to the mixture to bring the pH level to 9.8 (approximately 6 equivalents). The mixture is then stirred at room temperature. The resulting basic solution of sodium ammonium benzene sulfonate is then utilized in the preparation of the new stripping solutions.

The metal ammonium aromatic sulfonates can also be prepared by first adding the sodium hydroxide to the aromatic sulfonic acid to form the sodium aromatic sulfonate and then forming the basic ammonium aromatic sulfonate in a separate vessel and then combining the two mixtures. In this case, one preferably employs a mixture containing the salts in a ratio of metal salt to ammonium salt of 1:2 to 1:3.5.

The amount of the metal ammonium aromatic sulfonate to be used in the stripping solutions may vary within certain limits. In general, the desired results are obtained when this wetting agent is employed in amounts varying from about 7 percent to about 20 percent by weight, and still more preferably from about 10 percent to about 15 percent by weight.

The other component of the wetting agent composition comprises a non-ionic surface active material. Any suitable non-ionic surface acting material may be used in the preparation of the new compositions. Examples of these agents include, among others, nonylphenylethylene oxide, alkylaryl polyether, alcohols, ethylene oxide esters and ethers, acetylenic alcohols or glycols or their ethoxylated derivatives.

The amount of the non-ionic surface active material to be used in the preparation of the new stripping solutions may vary over a considerable range. In general, the amount will vary from about 2 percent to about 6 percent, and still more preferably from 2 percent to 4 percent by weight.

The wetting agent composition has a special and unique role in the new stripping compositions. While the role has not been fully established it is believed that the blend of the two special agents noted above gives rise to a polar solvent that attaches to the metal interface and allows for the inhibiting action that prevents the formation of rust on ferric and ferrous metals and their alloys. Although a polar film of micro-mil thickness is formed on the metal interface, no detrimental characteristics are noted as far as rinsing the surface area is concerned. It is also noted that there is no lessening or mitigating or adhesive or cohesive properties as a result of the polar film formation on the stripped substrate.

Vapor Suppressant

Any known suitable vapor suppressant can be used in preparing the new stripping solutions of the present invention. In general, paraffin wax meets the need and is readily and economically available and is the preferred material to be used. The paraffin wax preferably has a melting point between 128 degrees F. to 132 degrees F., and consists essentially of a saturated hydrocarbon with the formula $C_{36}H_{74}$. A non-toxic solvent may be utilized to incorporate the paraffin wax in the formulation if desired.

The amount of the vapor suppressant to be used may vary over a considerable range depending upon the solvent employed. In general, the amount of the agent will vary from about 1 percent to about 5 percent by weight, and more preferably from about 2 percent to about 3 percent by weight of the stripping solution.

The suppressant is utilized in the formulation to retard the evaporation of the volatile solvent portion of the solution. As noted, the wax is preferably solubilized in a solvent medium before being added to the stripping solution composition.

The new compositions of the invention also preferably containing other useful compositions, such as a small amount of water and a thixotropic agent as noted hereafter.

Water Activator

The water is preferably added to the stripping solutions in only very minor amounts, and in general, the amounts vary from about 0.5 percent to about 5 percent by weight. Preferably the amount of water will vary from about 0.5 percent to 3 percent by weight.

The role of the water in the new compositions is not completely understood, but it is believed to enhance the removal characteristics of the new compositions. Also at the indicated percentage, it is noted that a solution is formed that is a semi-creamy collodial solution and that the addition of the water acts to give an azeotropic action to the chlorinated solvent. Thus, it has been determined that the constant boiling range of the solvent, such as methylene dichloride, is reduced 15 degrees F. when used in the preferred composition containing the water.

Thixotropic Agent

While a thixotropic agent is not essential if the stripping solution is to be used on flat or contained surfaces, it is important to use such an agent in the new stripping solutions if the solution is to be used for the stripping of vertical surfaces, as the presence of such material increases the viscosity of the solution and holds the solution in contact with such surfaces. It is important to allow the stripping solution to remain in contact with vertical surfaces for a period of at least 30 minutes so as to achieve a 100 percent removal of the coating.

The preferred thixotropic agent to be used in a derivative of methyl cellulose. The especially preferred agent is Methocel, a tradename for hydroxypropylmethylecellulose.

The amount of the thixotropic agent to be used may vary over a wide range depending upon the type of wetting agent to be used and the desired viscosity to be utilized. In general, the amount of the agent employed will vary from about 1 percent to about 10 percent by weight and preferably from 2 percent to 5 percent by weight. As noted, it has been found that increasing the amount of wetting agent will give rise to an increased amount of thickening agent to be added to stabilize the solution at the desired viscosity level.

Method of Preparation

The new stripping and conditioning solutions of the present invention may be prepared by mixing the above-noted ingredients together in any desired order. In general, it is desired to combine the two components of the solvent composition together and mix this with the vapor suppressant. The two components of the wetting agent composition are then mixed together and this mixture is then combined with the solvent-vapor suppressant mixture. Water is then preferably added in the desired amount and the combined mixture blended together by mixing for several hours to form a stable solution. The preparation is preferably conducted at ambient temperature and pressure, although higher or lower temperatures and pressures may be used as desired or necessary.

The resulting stripping and condition solution is a substantially stable liquid solution having viscosity varying from about 275 Cs. to about 400 Cs. The solutions are essentially basic in terms of pH and preferably have a pH between about 9.5 to about 10. The boiling temperature ranges from about 86 degrees F. to about 95 degrees F.

Use of the New Stripping and Conditioning Solutions

The new stripping and conditioning solutions described above may be used to strip any known coating from a variety of substrate. As noted above, the application of the new solutions effects a 100 percent removal of all coating systems including the top coating and the primer coating. The coatings may be of any known type, including acrylic/urethane, cured epoxies, acrylic lacquers, acrylic nitrocellulose coatings, polyvinyls, polyurethanes, polycarbonates, polyallylic, polysulfides, polyolefins, and the like, and mixtures thereof.

The coatings may be those applied to any known substrate including wood, metal, glass, rubber, concrete, plastics such as polyesters, ABS, polyurethanes, and other surfaces which include materials encountered in the electrical or electronic arts, such as semi-conductors containing silicon or germanium, and preferably silicon or silicon dioxide. The metal substrates may be any metal or alloy thereof including cold roll steel, magnesium, aluminum, titanium, stainless steel, back iron, cast iron, alloys of the above.

The substrate may be in the form of straight panels or in the shape of formed members as may be found in the construction of appliances, trains, buses, cars, boats, aircraft, toys and the like.

The new stripper and conditioning solutions may be utilized by merely spraying, painting, dipping or otherwise coating the coated substrate with the desired solution. In most cases, it is preferred to coat a thin layer of the solution on the coated member to form a film of from about 30 mils to 50 mils thick and then allowing the coating to remain in contact with the coated substrate for a period of preferably about 30 minutes to effect 100 percent removal. Longer or shorter periods may be needed to effect such removal but that can be determined for each individual case. Under normal conditions at the end of the treatment period, the coating (topcoat/primer) may be lifted off the substrate in large sheets. In some cases it will literally "pop-off" due to the internal stress of the coating. The lifted coating can be easily removed with a stream of water or air. It is generally preferred to wash and rinse the substrate with cold water to remove the stripped coating and prepare the substrate for subsequent treatment.

Temperatures employed in the treating process may vary over a considerable range, but generally the temperature will vary from about room temperature to about 5 to 10 degrees above room temperature. Higher temperatures will of course effect volatilization of the solvent and this should generally be avoided. Rinsing temperatures generally range from about 50 degrees F. to about 70 degrees F.

As noted above, after the stripped substrate has been rinsed and washed with cold water it can then be immediately treated with a subsequent coating without prior treatment such as the customary phosphatizing or anodizing of the surface. Coatings applied directly to the treatment substrate have excellent adhesive and cohesion even without the prior treatment.

To illustrate the new stripping and conditioning solutions of the present invention, the following examples are given. It is to be understood, however, that the examples are given in the way of illustration and are not to be regarded as limiting the invention in any way.

EXAMPLE I

This example illustrates the preparation of the new stripping and conditioning solution and its use in treating coated substrates, particularly in comparison to known stripping solutions.

(A) A solution was prepared by mixing in a glass reaction vessel 330 ML of methylene dichloride and 88 ML of isopropyl alcohol. To this mixture was added 12.5 ML of hydroxypropylmethylcellulose and the mixture blended together. 77 ML of sodium ammonium benzene sulfonate prepared as shown above was then added to the mixture and the combined mixture stirred for about 15 minutes to allow for thorough dispersion.

TABLE NO. 1

| EXP. NO. | AUTO FROM WHICH PANEL WAS DERIVED | TYPE OF TOPCOAT | TYPE OF PRIMER | NO. OF APPLICATIONS OF SOLUTION | TIME FOR REMOVAL OF COATING | CONDITION OF STRIPPED PANEL |
|---|---|---|---|---|---|---|
| 1 | Mercury | Acrylic Enamel | Nitrocellulose | 1 | less than 30 mins. | clear and rust free |
| 2 | Lincoln | " | " | 1 | " | " |
| 3 | Ford Fairlane | " | " | 1 | " | " |
| 4 | Dodge | Baked Enamel | " | 1 | " | " |
| 5 | Plymouth | " | " | 1 | " | " |
| 6 | Chrysler | " | " | 1 | " | " |
| 7 | Chevrolet | Acrylic Lacquer | Blac-dip Cathodic (epoxy ester) | 1 | " | " |
| 8 | Cadillac | " | Blac-dip Cathodic (epoxy ester) | 1 | " | " |
| 9 | Buick | " | Blac-dip Cathodic (epoxy ester) | 1 | " | " |
| 10 | Oldsmobile | " | Corlar (Cathodic) | 1 | " | " |
| 11 | Volkswagen | Catalized Acrylic Enamel | Nitrocellulose | 1 | " | " |
| 12 | Datsun | Polyurethane Clear-cost | " | 1 | " | " |
| 13 | Toyota | Polyurethane Sun Fire | — | 1 | " | " |

To this mixture is then added 22 ML of nonylphenolethylene oxide. After stirring, approximately 16.5 ML of paraffin wax having a melting point of 128 degrees F. is then added. This mixture is then agitated for a period of approximately 15 minutes to allow for total dispersion. To all of the above is then added 3 ML of water and the mixture stirred for an additional 15 minutes. The mixture appears as a creamy semi-emulsion having a pH of about 9.8.

(B) The above solution was then used as a stripping and conditioning solution for removing organic top coats and primer coats from various substrate. This was accomplished by spraying the solution on the coated panels at approximately room temperature and to a thickness of about 45 mils. The solution was allowed to remain on the coated panels for about 30 minutes. The panels were then rinsed and washed with cold water to remove the peeled coatings.

The panels treated, the time for removal and the condition of the resulting stripped substrate are shown in Table I. As shown, all coatings were removed in less than 30 minutes with one application.

(C) This portion of the Example illustrates the superior condition of the stripped substrate panels as to resistance to rusting even after days of storage.

The stripped panels produced as above were rinsed with cold water and stored inside at a temperature of 60 degrees F. and humidity of 6 Mo. for the periods shown and the time for appearance of rust was noted.

The panels stored and the time for appearance of rust was noted as shown in Table II. As noted in the table, all panels were rust free for a period of at least 2 to 6 months.

(D) This portion of the Example shows a comparison of the results obtained with the new stripping and conditioning solutions of the present invention as compared to results obtained with known commercial strippers.

All panels were treated as in (B) above and the degree of removal of the coating and the condition of the panels were noted. The results are shown in Tables III and IV. As shown in the table only the new composition disclosed above gave a 100 percent stripping of all panels and resulted in a film free rust resistant panel surface.

TABLE NO. 2

| | | | RESISTANCE TO RUSTING | | | |
|---|---|---|---|---|---|---|
| EXP. NO. | AUTO FROM WHICH PANEL WAS DERIVED | TYPE OF TOPCOAT | TYPE OF PRIMER | NO. OF APPLICATIONS | TIME FOR REMOVAL OF COAT | TIME FOR APPEARANCE OF RUST AFTER STRIPPING AND RINSING (Inside) |
| | Chevrolet Chevette | Acrylic Lacquer | Cathodic Blac-dip | 1 | 20 mins. | 6-Mos. inside conditions 7-Days outside conditions |
| | Ford Fairlane | Acrylic Enamel | Anodic Nitrocellulose | 1 | 15 mins. | 6-Mos. inside conditions 7-Days outside conditions |
| | Ford Lincoln | Acrylic Enamel | Anodic Nitrocellulose | 1 | 18 mins. | 6-Mos. inside conditions 7-Days outside conditions |
| | Chrysler Le Baron | Catalized Acrylic Enamel | Anodic Nitrocellulose | 1 | 12 mins. | 6-Mos. inside conditions 7-Days outside conditions |
| | Datsun 210 SX | Clear Coat Polyurethane | Polyester Primer | 1 | 10 mins. | 6-Mos. inside conditions 7-Days outside conditions |
| | Dasher Volkswagen | Catalized Urethane Enamel | Polyester Primer | 1 | 26 mins. | 6-Mos. inside conditions 7-Days outside conditions |

TABLE NO. 3

| EXP. NO. | STRIPPING SOLUTION EMPLOYED | % OF PANELS 100% STRIPPED PAINT | METAL PREPARATION | FILM FREE RINSE | TOXICITY PPM | BIO-DEGRADABLE | ACTIVATOR | CORROSIVE TO METALS |
|---|---|---|---|---|---|---|---|---|
| 1 | SOLUTION OF EXAMPLE I | 100% | Yes | Yes | 200 | 98% | Base | No |
| 2 | A* | 60% | No | No | 50 | 0 | Base | No |
| 3 | B* | 40% | No | No | 50 | 90 | Base | No |
| 4 | C* | 60% | No | No | 10 | 90 | Acid | Yes |
| 5 | D* | 30% | No | No | 25 | 96 | Acid | Yes |
| 6 | E* | 30% | No | No | 25 | 96 | Acid | Yes |

*Stripping solutions A to E were competitive commercial products.

TABLE NO. 4

| EXP. NO. | AUTO FROM WHICH PANEL WAS DERIVED | TYPE OF TOPCOAT | TYPE OR PRIMER | NO. OF APPLICATIONS | RESISTANCE TO RUSTING TIME FOR REMOVAL OF COAT | TIME FOR APPEARANCE OF RUST AFTER STRIPPING AND RINSING (Inside) |
|---|---|---|---|---|---|---|
| 1 | Ford Pinto | Catalized Acrylic Enamel | Nitrocellulose | 1 | 1 Hr. | 24 Hr. Base Stripper |
| 2. | Chevet Chevrolet | Acrylic Lacquer | Cathodic Primer | 3 | 8 Hr. | 24 Hr. Base Stripper |
| 3. | Datsun | Clear Coat Polyurethane | Nitrocellulose | 1 | 20 Min. | 2 Hr. Acid Stripper |
| 4. | Dodge | Acrylic Enamel | Nitrocellulose | 1 | 30 Min. | 2 Hr. Acid Stripper |
| 5. | Volkswagen | Catalized Acrylic Enamel | Nitrocellulose | 1 | 2 Hr. | 3 Hr. Acid Stripper |

*Stripper calculations used were those shown in Table 3.

EXAMPLE II

Example I is repeated with the exception that the methylene chloide is replaced with equivalent amounts of each of the following: Ethylene dichloride (Flammable), propylene dichloride, chlorotoluene. Removal percentages and dwell time were lower.

EXAMPLE III

Example I is repeated with the exception that the isopropyl alcohol is replaced with equivalent amounts of each of the following: butyl alcohol, ethylene glycol, omyl alcohol. Rate of removal and percent of removal decreased.

EXAMPLE IV

Example I is repeated with the exception that the sodium ammonium benzene sulfonate is replaced with equivalent amounts of each of the following: potassium ammonium benzene sulfonate and calcium ammonium p-toluene sulfonate. Related results are obtained.

I claim as my invention:

1. A stripping and conditioning solution useful for removing coatings from coated substrate and conditioning the substrate for subsequent coating treating consisting essentially of a mixture of (1) a solvent composition comprising a chlorinated solvent and a liquid alcohol containing at least three carbon atoms, (2) a wetting composition comrising basic metal ammonium salt of an aromatic sulfonic acid, and a non-ionic surface active material, (3) a vapor suppressant.

2. A composition as in claim 1 which also contains a thixotropic agent.

3. A solution as defined in claim 1 wherein the chlorinated solvent is an aliphatic polychlorinated solvent and is present in an amount varying from about 50 percent to 70 percent by weight of the solution.

4. A solution as defined in claim 1 wherein the alcohol portion of the solvent composition is an aliphatic monohydric alcohol containing from 3 to 8 carbon atoms and is present in an amount varying from about 6 percent to 26 percent by weight of the solution.

5. A solution as defined in claim 1 wherein the basic metal ammonium salt of an aromatic sulfonic acid is an alkali metal ammonium salt of a benzene sulfonic acid and is present in an amount varying from 7 percent to 20 percent by weight of the solution.

6. A solution as defined in claim 1 wherein the non-ionic surface active material is an alkylene oxide adduct of a nonylphenol and is used in an amount varying from 2 percent to 6 percent by weight.

7. A solution as defined in claim 1 wherein the vapor suppressant is a paraffin wax and is present in an amount varying from 1 percent to 5 percent by weight of the solution.

8. A solution as defined in claim 1 which also contains water in an amount varying from about 0.5 percent to 5 percent by weight of the solution.

9. A solution as defined in claim 1 wherein the chlorinated solvent is methylene chloride.

10. A solution as defined in claim 1 wherein the alcohol is isopropyl alcohol.

11. A solution as defined in claim 1 wherein the wetting agent component is sodium ammonium benzene sulfonate having a pH of 9 to 10.

12. A solution as defined in claim 1 wherein the nonionic surface active material is nonyl phenolethylene oxide.

13. A solution as defined in claim 1 which also contains from 1 percent to 10 percent by weight of a thixotropic agent.

14. A solution as in claim 13 wherein the thixotropic agent is hydroxypropylmethylcellulose.

15. A solution as in claim 1 wherein the basic metal ammonium salt of an aromatic sulfonic acid is one prepared by adding an alkali metal hydroxide to an aromatic sulfonic acid to obtain a pH of 4 to 5 and then adding ammonium hydroxide to the resulting product to obtain a pH of 9 to 10.

16. A process for stripping a coating from a substrate and conditioning the resulting substrate for subsequent treatment with another surface coating which comprises applying to the coated substrate a thin film of a stripping solution as defined in claim 1, allowing the solution to remain on the coating until substantially stripped and then removing the stripped coating from the substrate.

17. A process as in claim 16 wherein the solution is applied in a film of 40 to 50 mils and allowed to remain on the substrate for a period of 10 to 40 minutes.

18. A process as in claim 16 wherein the stripped coating is removed by washing with cold water.

19. A process as in claim 16 wherein the coating is an acrylic coating and the substrate is metal.

20. A process as in claim 16 wherein the coating to be removed is an epoxy coating.

* * * * *